United States Patent
Wu (10) Patent No.: US 8,085,025 B2
(45) Date of Patent: Dec. 27, 2011

(54) SHORT CIRCUIT CURRENT RATCHETING IN SWITCH MODE DC/DC VOLTAGE REGULATORS

(75) Inventor: Andrew Wu, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 101 days.

(21) Appl. No.: 12/776,668

(22) Filed: May 10, 2010

(65) Prior Publication Data

US 2010/0220421 A1  Sep. 2, 2010

Related U.S. Application Data (62) Division of application No. 11/216,276, filed on Aug. 30, 2005, now Pat. No. 7,714,558.

(60) Provisional application No. 60/605,423, filed on Aug. 30, 2004.

(51) Int. Cl.
*G05F 1/00* (2006.01)
(52) U.S. Cl. ........................ 323/284; 323/285
(58) Field of Classification Search .......... 323/282–286; 361/794, 762, 782; 363/65, 67, 71, 72, 13
See application file for complete search history.

(56) References Cited

U.S. PATENT DOCUMENTS

| | | | | |
|---|---|---|---|---|
| 6,396,252 | B1 * | 5/2002 | Culpepper et al. | 323/285 |
| 6,646,425 | B2 * | 11/2003 | Miftakhutdinov | 323/285 |
| 7,714,558 | B2 * | 5/2010 | Wu | 323/284 |
| 7,880,455 | B2 * | 2/2011 | Wu | 323/284 |
| 2010/0220421 | A1 | 9/2010 | Wu | |

FOREIGN PATENT DOCUMENTS

| | | |
|---|---|---|
| TW | 479439 B | 3/2002 |
| TW | 583525 B | 4/2004 |

OTHER PUBLICATIONS

Search Report for Taiwanese Patent Application No. 094129790, Monolithic Power Systems, Inc., Jan. 18, 2008, 1page.

* cited by examiner

*Primary Examiner* — Jue Zhang
(74) *Attorney, Agent, or Firm* — Perkins Coie LLP (57) ABSTRACT

A regulator with a high side pass device and a low side pass device coupled in series to the high side pass device is disclosed. The apparatus further includes a control module coupled to the high side pass device and the low side pass device. The control module is coupled to the high side pass device and the low side pass device to control the high side pass device and the low side pass device. The control module is operable to lock out the high side pass device under certain conditions.

17 Claims, 7 Drawing Sheets

SHORT CIRCUIT CURRENT RATCHETING IN SWITCH MODE DC/DC VOLTAGE REGULATORS

CROSS-REFERENCE TO RELATED APPLICATION

This application is a divisional of U.S. patent application Ser. No. 11/216,276, filed Aug. 30, 2005 now U.S. Pat. No. 7,714,558 and titled SHORT CIRCUIT CURRENT RATCHETING IN SWITCH MODE DC/DC VOLTAGE REGULATORS, which claims priority to U.S. Provisional Patent Application No. 60/605,423, filed Aug. 30, 2004 and titled SHORT CIRCUIT CURRENT RATCHETING IN SWITCH MODE DC/DC VOLTAGE REGULATORS, each of which is incorporated herein by reference in its entirety.

BACKGROUND

A DC/DC voltage regulator is operative to maintain a level output voltage despite variations in power supply voltage or current drawn by a load. Many portable devices require a steady voltage supply such as that provided by a DC/DC voltage regulator. Switch mode regulators can be subject to a phenomenon of current ratcheting at shorted loads due to finite on times to determine an over current condition. Nearly every switch-mode device has a finite loop response time to measure current in the inductor. Depending on the input voltage, the current can rise high enough to cause a catastrophic failure in a device.

For this reason, in fixed frequency parts, it is common to use frequency fold-back to change the amount of current ratcheting that a part can see. A common problem caused by frequency fold-back is a large current ripple in the inductor. For this reason, a larger than normal bypass or output capacitor is chosen to reduce the ripple voltage. And if the frequency is folded back too much, the loop may become unstable. Thus, choosing the correct fold-back frequency range for wide application is not an easy task.

SUMMARY

The present invention is described and illustrated in conjunction with systems, apparatuses and methods. In addition to the aspects of the present invention described in this summary, further aspects of the invention will become apparent by reference to the drawings and by reading the detailed description that follows.

In an embodiment, a DC/DC switch mode voltage regulator with a high side pass device and a low side pass device is provided. The voltage regulator includes means for detecting an over current condition over a current limit on the high side pass. The voltage regulator also includes means for locking out the high side pass device and turning on the low side pass device until a second current limit located on the low side pass device is reached if the over current condition is detected.

In another embodiment, a method implemented on a DC/DC switch mode voltage regulator with a high side pass device and a low side pass device is provided. The method includes detecting an over current condition over a current limit on the high side pass. The method also includes locking out the high side pass device and turning on the low side pass device until a second current limit located on the low side pass device is reached if the over current condition is detected.

In still another embodiment, an apparatus is provided. The apparatus includes a high side pass device. The apparatus also includes a low side pass device coupled in series to the high side pass device. The apparatus further includes a control module coupled to the high side pass device and the low side pass device. The control module is coupled to the high side pass device and the low side pass device to control the high side pass device and the low side pass device.

Additionally, the apparatus includes a first resistor coupled in series with the high side pass device and the low side pass device. Furthermore, the apparatus includes a first comparator coupled in parallel with the first resistor. The first comparator has a threshold voltage input differential corresponding to a first current limit, and an output of the first comparator is coupled to the control module. Moreover, the apparatus includes a second comparator coupled to sense current of the high side pass device as a voltage. The second comparator has a threshold voltage input differential corresponding to a second current limit. An output of the second comparator is coupled to the control module. The second current limit is higher than the first current limit. Also, the control module is operable to lock out the high side pass device responsive to the output of the first comparator until a reset signal is received and is operable to lock out the high side pass device responsive to the output of the second comparator until a low current signal is received.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

A system, method and apparatus is provided for Short Circuit Current Ratcheting in Switch Mode DC/DC Voltage Regulators. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

The present invention describes, in some embodiments, a new scheme that eliminates frequency fold-back from the protection scheme of switch-mode regulators and allows for a clean startup without the need for a change in switching frequency for the entire duration of operation.

In some embodiments, a sense element is used to measure the current in the inductor. A comparator is used to compare the sense element to another matching element that depicts a finite known current threshold indicating the overcurrent conditions. When this current threshold is exceeded, the comparator signals the logic to latch the low side switch on until a low side current limit is reached. This current limit on the low side can be set to any value positive, negative, or zero inductor current depending on the application.

A DC/DC switching voltage regulator, in some embodiments, consists of a PWM controller, two controlled pass devices that are connected in series between a supply voltage and ground, an inductor that is connected to the common point between the two pass devices, and a capacitor connected between the output node and ground after the inductor. By modulating the pass devices, the inductor will build up energy and discharge it into the capacitor. The charge and discharge rates are governed by the equation:

$$V = L\frac{dI}{dT}$$

The increase in current in the inductor is $$dI_{charge} = \frac{Vin - R_{onup} \times dI_{charge} - Vout}{L} dT_{on}$$

where Vin is the supply voltage, Vout is the output voltage, and Ronup is the resistance in the upper pass device. The discharge current in the inductor is defined by the equation:

$$dI_{discharge} = \frac{Vout + R_{ondwn} \times dI_{discharge}}{L} dT_{off}$$

where Rondwn is the resistance in the lower pass device. During normal operation dIcharge=dIdischarge and dTon and dToff is a function of the switching frequency. Since the loop takes a finite time to respond there is a minimum on time for the switch. This time can be as low as 20 nanoseconds but as high as 200 nanoseconds. This is due to the fact that the upper pass element needs to be turned on to detect the amount of current in the inductor, and then turned off. The length of the minimum on time can be attributed to driver delays, PWM comparator delays, current sense amplifier delay, and so on.

Current ratcheting is a condition that exists when dIcharge>dIdischarge. This can occur when the output is shorted to ground, then dTon=dTmin, and Vout is 0. Then the amount of energy discharged by the inductor during the dToff is small, and the current continues to rise cycle by cycle. The conventional way to make sure that the inductor is discharged is by increasing the dToff time, and by lowering the frequency of operation. In accordance with various embodiments, the inductor current is sensed and if the current ratchets above a fixed value, the loop will lock out the upper pass device and latch the lower pass device until the current has decayed to a preset limit.

Figures 1, 2:
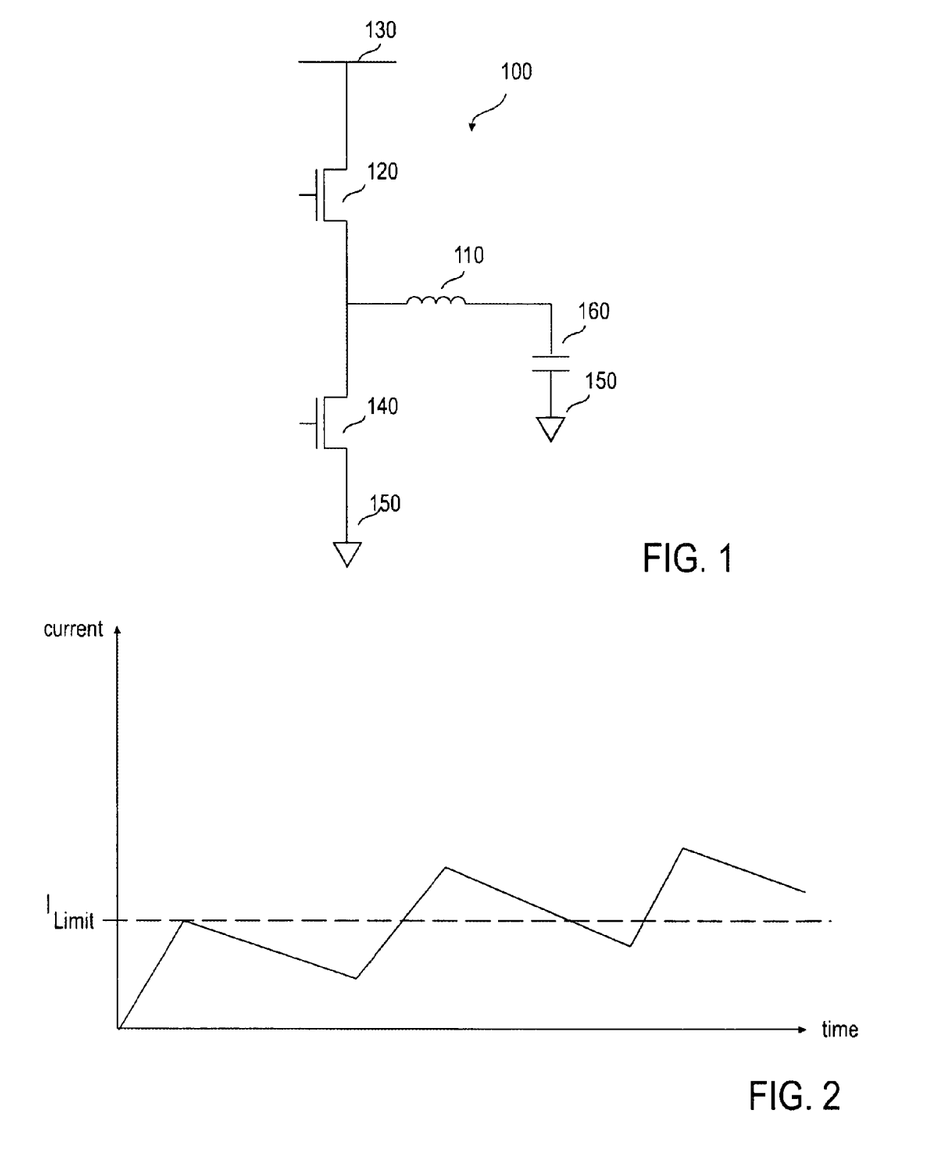
FIG. 1 illustrates an embodiment of a DC-DC voltage regulator output.
FIG. 2 illustrates current overload in the embodiment of FIG. 1.

Reference to the figures may provide further understanding of various embodiments. FIG. 1 illustrates an embodiment of a DC-DC voltage regulator output. System 100 includes high and low supply transistors between a power rail and ground, an inductive load and a capacitor. Inductive load 110 may be an actual inductor or a component which operates in a manner similar to an inductor. Capacitor 160 is coupled between inductive load 110 and ground 150. Power is supplied to load 110 through power transistor 120 (current is sourced) from power supply 130. Current may be sunk from inductive load 110 through power transistor 140 to ground 150.

This design involves a potential problem, in that the time it takes to turn transistors 120 and 140 on and off may be long enough to allow currents to overload inductor 110. FIG. 2 illustrates current overload in the embodiment of FIG. 1. Current levels approach a limit value, and the system reduces the current level. However, the decay time for the current may not allow the current level to drop to zero. As a result, the device may then increase the current level again, this time overshooting the maximum current limit before the system reduces current again. This typically happens as a result of the frequency at which the system operates—it may reset the voltage regulator before the current decays to an acceptable level.

Figure 3:
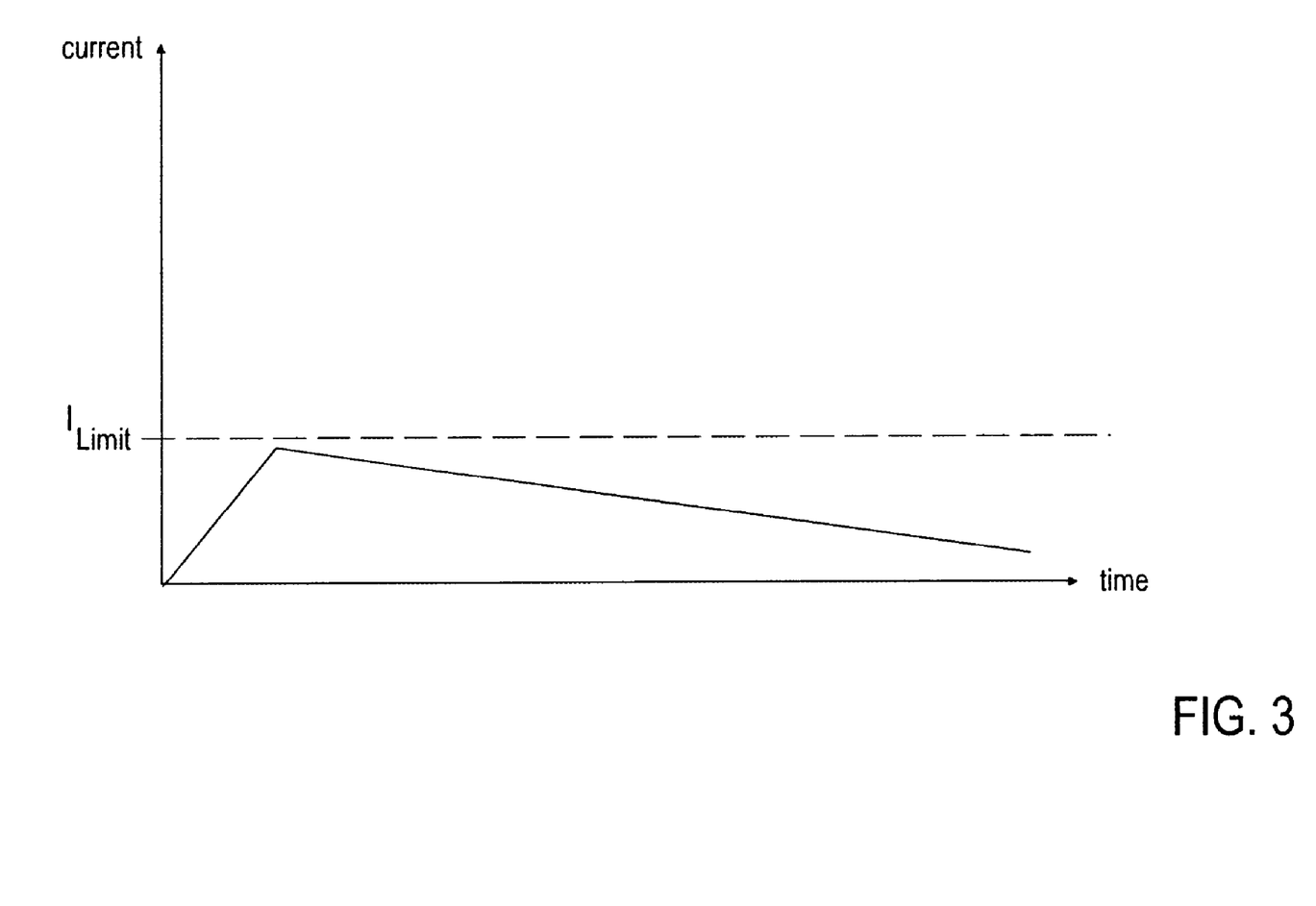
FIG. 3 illustrates frequency folding in the embodiment of FIG. 1.

A common response to this problem is to fold frequency—to reduce the operating frequency of the system so that current levels can be reduced acceptably in overlimit situations. FIG. 3 illustrates frequency folding in the embodiment of FIG. 1. Instead of allowing the system to reset and have the current level ratchet up, the current is allowed to decay over a longer time until an acceptable limit is reached. Not shown is the lead-up to this situation, where the device may run to the limit, and then be reduced to a level too high to avoid an overcurrent situation. Frequency folding can avoid the overcurrent situation, but it also slows down operation of the system and the load to which power is supplied.

Figure 4:
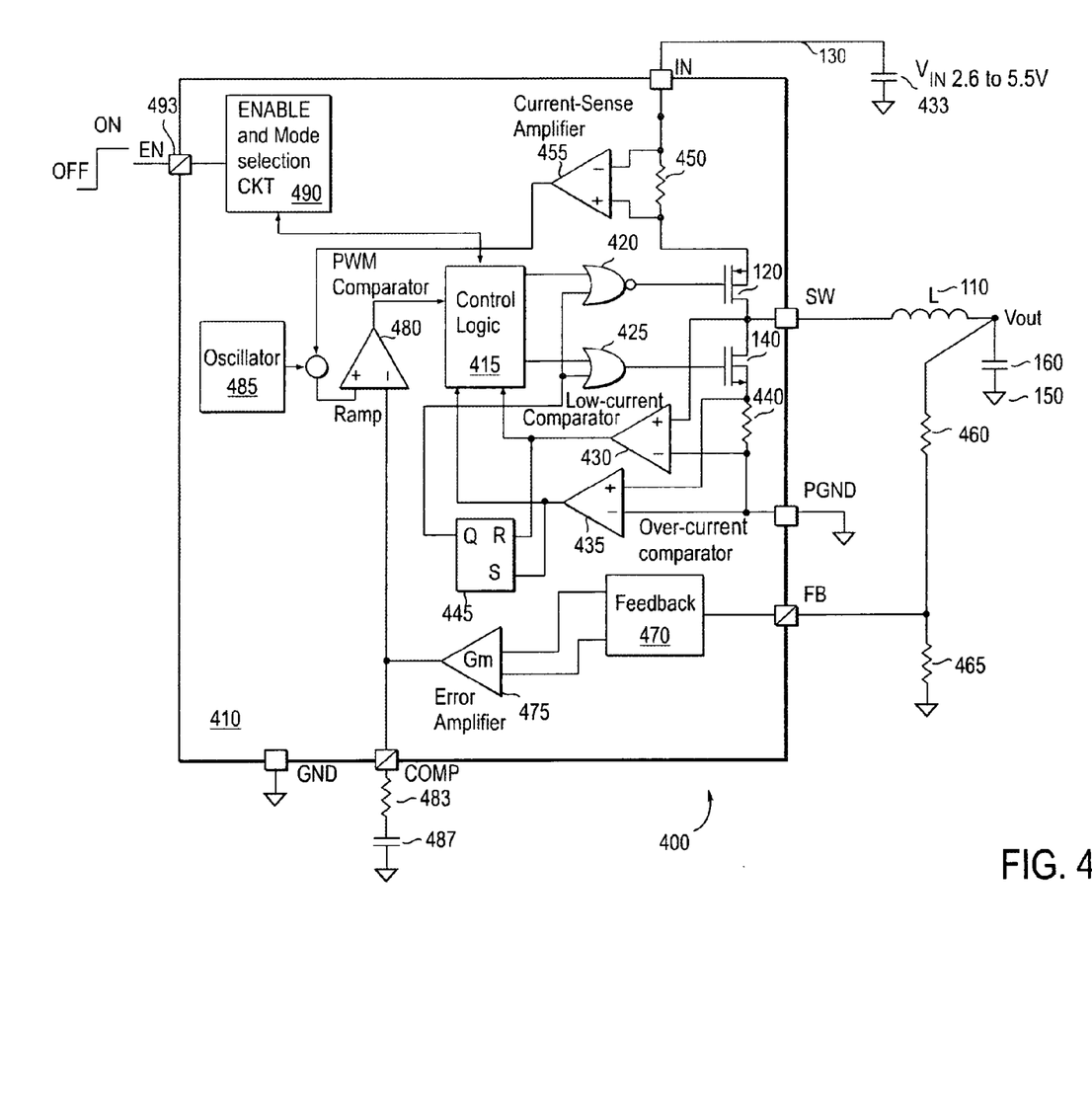
FIG. 4 illustrates an embodiment of a current overload protection apparatus for the DC-DC voltage regulator output of FIG. 1.

As an alternative, circuitry may be introduced to sense the current level and ensure that overcurrent situations are allowed to decay appropriately. FIG. 4 illustrates an embodiment of a current overload protection apparatus for the DC-DC voltage regulator output of FIG. 1. System 400 includes device 410 (a DC-DC voltage regulator) various exterior circuitry which may be supplied as part of an overall system. Device 410 may be enabled by enable input 493, which is tied to internal enable circuitry 490. Power may be supplied from a power supply which is modeled as capacitor 433.

Current into the load 110 through power transistor 120 is monitored passing that current through resistor 450 which is sensed in current sense amplifier 455 (an amplifier which level-shifts the voltage across its inputs and amplifies that voltage). The output of comparator 450 is mixed with the output of an oscillator 485 and provided as input to comparator 480. Along with feedback through feedback module 470 and error amplifier 475, comparator 480 and control module 415, this provides the feedback loop for the pulse width modulator of device 410. Resistors 460 and 465 provide a resistive divider from which a voltage level is drawn for feedback component 470. Similarly, resistor 483 and capacitor 487 provide an RC component which controls the output of comparator 475.

Comparator 435 senses current from resistor 440, which is coupled in series with power transistor 140, and provide a set input to flip-flop 445. Comparator 430 senses current through resistor 440 and power transistor 140 (the same current) and provides a reset input to flip-flop 445. These outputs are also provided to control logic 415. Typically, control logic 415 operates gates 420 and 425 to turn power transistors 120 and 140 on and off. However, when an overcurrent condition is sensed, the output of flip-flop 445 causes transistor 140 to turn on and transistor 120 to turn off. Once current through transistor 140 has decayed sufficiently, flip-flop 445 is reset, and normal operation returns. Thus, by altering trip points of comparators 430 and 435, various current levels for overlimit and low current can be set.

Figure 5:
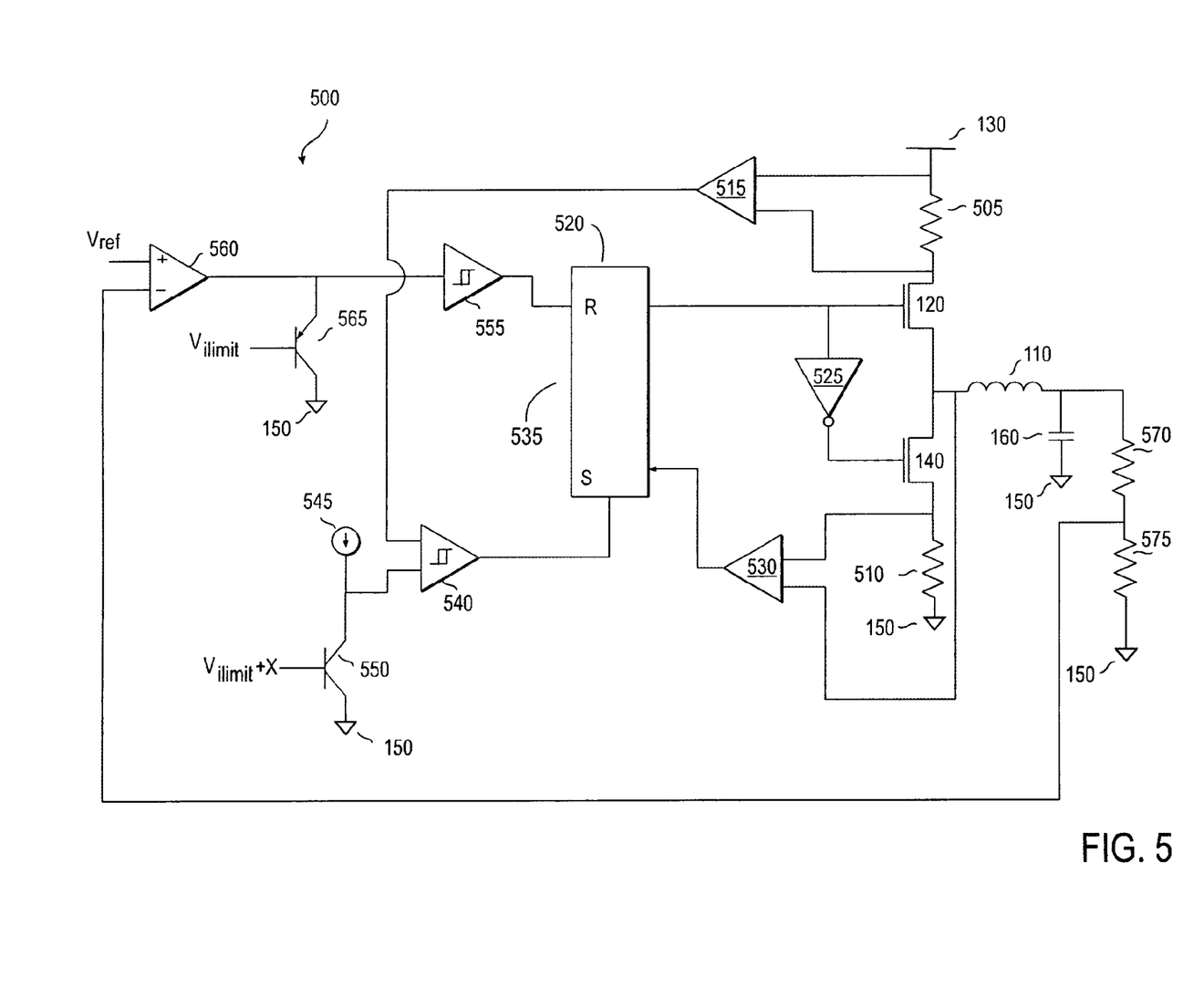
FIG. 5 illustrates an alternate embodiment of the current overload protection apparatus for the DC-DC voltage regulator output of FIG. 1.

An alternate embodiment of regulation circuitry may be described without reference to the surrounding pulse width modulation circuitry. FIG. 5 illustrates an alternate embodiment of the current overload protection apparatus for the DC-DC voltage regulator output of FIG. 1. System 500 operates the power supply to load 110. Resistive divider 570 and 575 provides a voltage which is fed back and compared with a reference voltage at comparator 560. The output of comparator 560 is biased with transistor 565, which receives a Vilimit voltage input to determine the bias level. Schmitt-triggered buffer 555 then provides the biased output of comparator 560 as a logic input to flip-flop 530. Flip-flop 520 then controls transistors 120 and 140 (through inverter 525). Note that in a full implementation of this device, buffer 555 may be an error amplifier similar to amplifier 475 of FIG. 4, which would then be integrated into the PWM feedback loop of the over all system. In the illustration of FIG. 5, the PWM feedback loop and other details are not illustrated to avoid obscuring details of the embodiment.

Current through transistor 120 can be measured using sense resistor 505 (coupled in series with transistor 120), comparator 515, and Schmitt-triggered comparator 540. Comparator 540 also receives as input the output of transistor 550, which is biased by a voltage Vilimit+X. Current source 545 completes the bias circuitry of this component. Thus, when current through sense resistor 505 causes a voltage exceeding the bias voltage of transistor 550, comparator 540 can set (or reset) the flip-flop 520. This allows for turning off supply of current to load 110. Similarly, when current has decayed sufficiently, this may be sensed through comparator 530, using sense resistor 510 and the output node coupled to load 110, for example. Thus, comparator 530 may reset (or set) flip-flop 520, allowing normal operation to continue.

Where exactly sense resistors 505 and 510 are placed, and how exactly overcurrent and undercurrent conditions are sensed may vary in different embodiments. Likewise, the values of Vilimit and Vilimit+X may be chosen as appropriate in various embodiments. Typically, Vilimit+X will be a higher value than Vilimit, and will provide a higher current limit as a limit which can be used to shut down the system and avoid a current overload.

Figure 6:
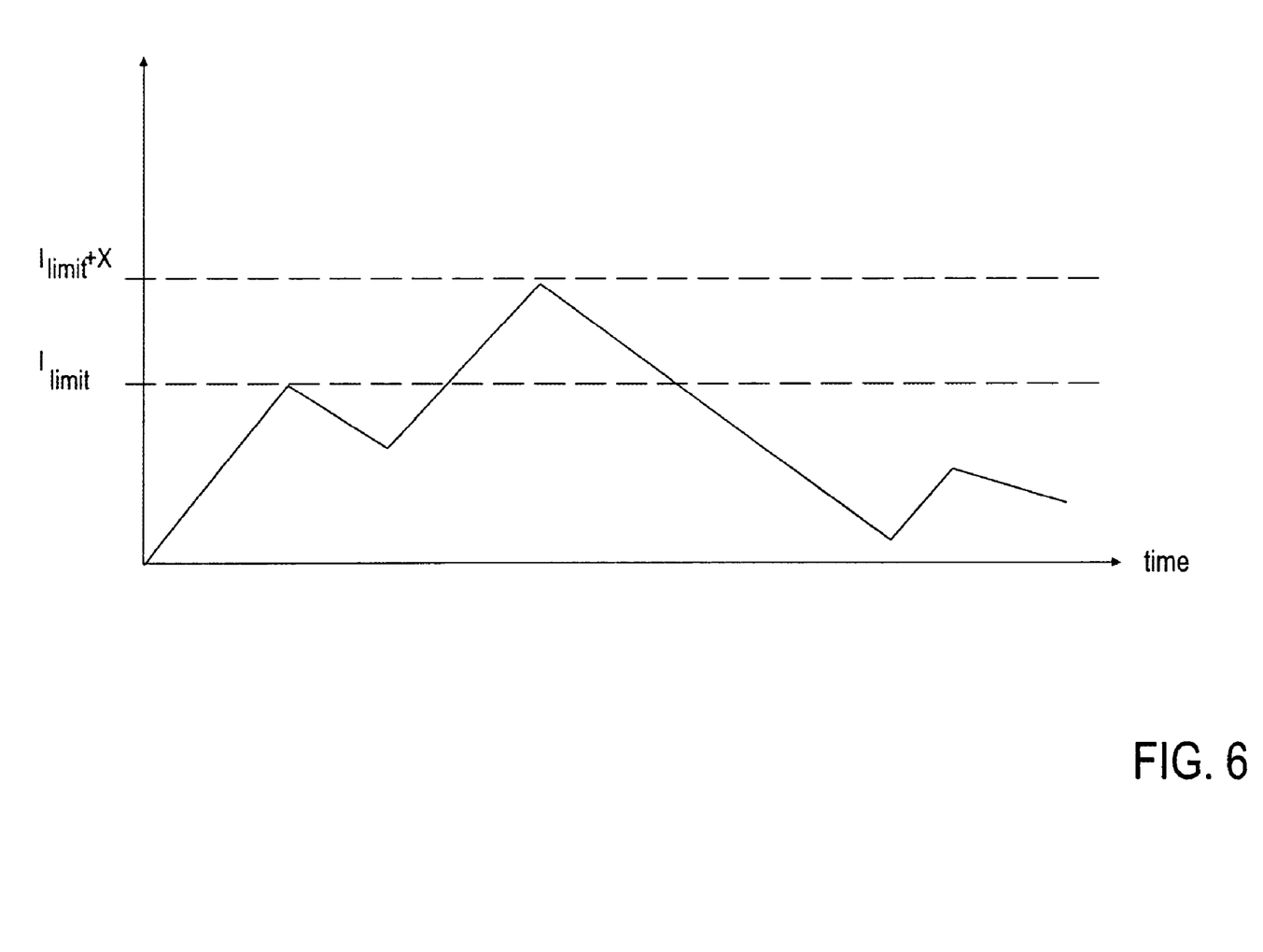
FIG. 6 illustrates current ratcheting in the embodiment of FIG. 4.

Operation of the device or system may be understood with reference to FIG. 6. FIG. 6 illustrates current ratcheting in the embodiment of FIG. 4. Current may rise to Ilimit, and then be ratcheted back down. If the device is operating at too high a frequency, then the current can increase to Ilimit+X. At this point, the device can be shut down (by turning off the high pass transistor 120 and turning on the low pass transistor 140) until the current decays to an acceptable level (as may be defined by a low current value).

Figure 7:
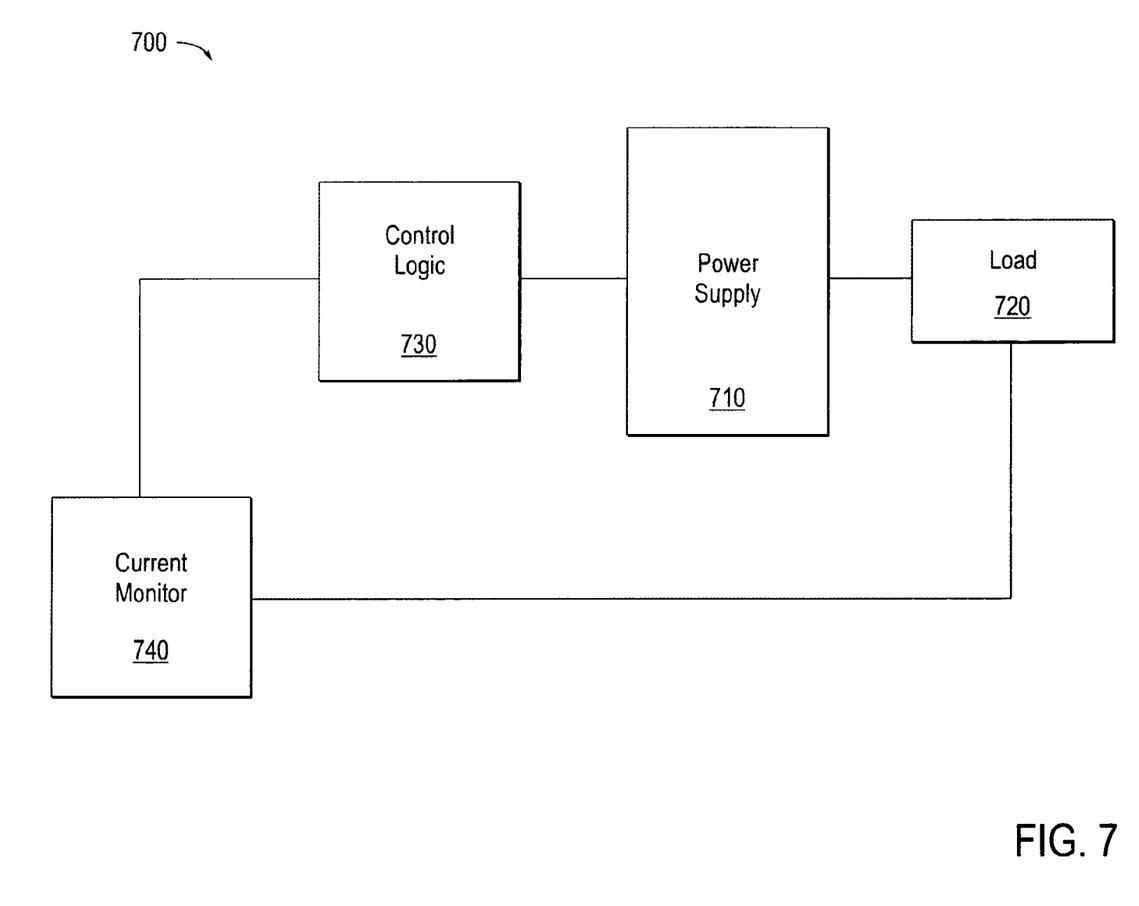
FIG. 7 illustrates another alternate embodiment of the current overload protection apparatus for the DC-DC voltage regulator output of FIG. 1.

Various embodiments can be implemented with the same general approach. FIG. 7 illustrates another alternate embodiment of the current overload protection apparatus for the DC-DC voltage regulator output of FIG. 1. System 700 includes a power supply, control logic, load, and current monitor. Power supply module 710 supplies power to load 720 under control of control logic 730. Current monitor 740 monitors supply of current to load 720, and interrupts control logic 730 to shut down power supply 710 when an overcurrent condition exists.

Figure 8:
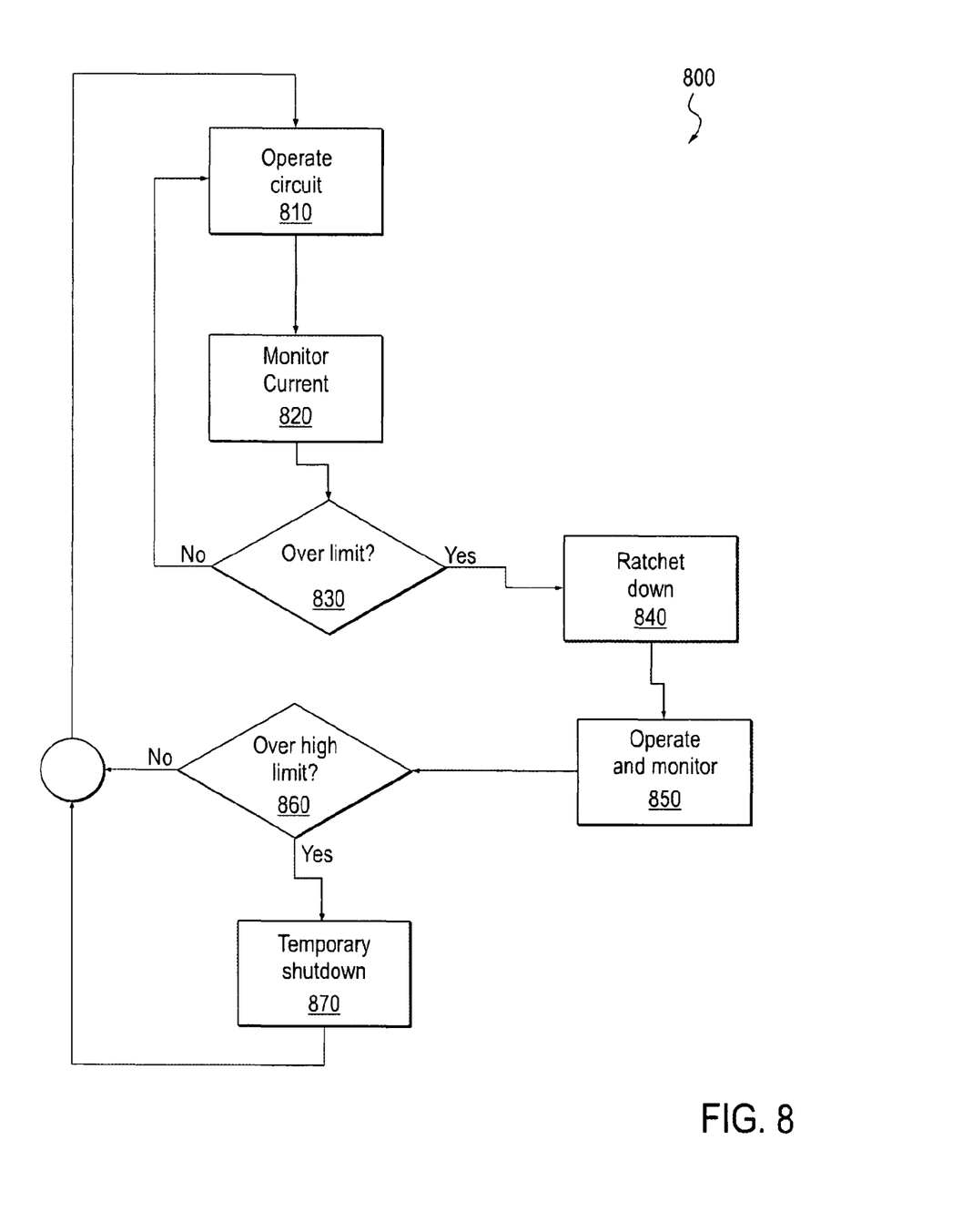
FIG. 8 illustrates an embodiment of a process of current limiting.

The process by which these circuits operate may also be illustrative. FIG. 8 illustrates an embodiment of a process of current limiting. Process 800 includes operating the device, monitoring current, ratcheting current down, further operation, determining if a high limit has been exceeded, and temporarily shutting down the device. Process (method) 800 and other processes of this document are implemented as a set of modules, which may be process modules or operations, software modules with associated functions or effects, hardware modules designed to fulfill the process operations, or some combination of the various types of modules, for example. The modules of process 800 and other processes described herein may be rearranged, such as in a parallel or serial fashion, and may be reordered, combined, or subdivided in various embodiments.

Process 800 begins with operation of the circuit at module 810. The current load of the circuit is monitored at module 820. If the current is not over a first limit, the circuit continues operation at module 810. If the current is over the first limit, the current is ratcheted down at module 840. The circuit then continues to operate at module 850. A determination is made at module 860 as to whether a high or second current limit has been exceeded. If not, the circuit continues operation at module 810. If the second current limit has been exceeded, then a temporary shutdown at module 870 occurs until the current load decays to an acceptable level.

In one embodiment, this is accomplished by using a first current limit of 1.7 A and a second current limit of 2.2 A. Thus, if the current exceeds 1.7 A, the system is turned off normally. If the current exceeds 2.2 A, then the system is turned off until the current decays to a low value.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

I claim:

1. An apparatus, comprising:
 a high side pass device;
 a low side pass device electrically coupled in series to the high side pass device;
 a control module electrically coupled to the high side pass device and the low side pass device to control the high side pass device and the low side pass device;
 over-current sensing circuitry comprising:
  a first comparator having a threshold voltage input differential corresponding to a first current limit to detect a current that exceeds the first current limit, wherein an output of the first comparator is electrically coupled to the control module;
  a second comparator having a threshold voltage input differential corresponding to a second current limit to detect a current that exceeds the second current limit, wherein an output of the second comparator is electrically coupled to the control module, and the second current limit is higher than the first current limit; and wherein the control module is operable to:

temporarily lock out the high side pass device and turning on the low side pass device responsive to at least one of the output of the first comparator or the output of the second comparator;

wherein the apparatus further comprises a third comparator electrically coupled to the low side pass device to detect a current that falls below a third current limit, wherein an output of the third comparator is electrically coupled to the control module to cause the control module to operate the high side pass device and the low side pass device.

2. The apparatus of claim 1, further comprising:
an enable input coupled to the control module; and
wherein the control module is operable to operate the high and low side pass devices responsive to the enable signal.

3. The apparatus of claim 1, wherein:
the high side pass device and the low side pass device are power MOSFETs.

4. The apparatus of claim 1, wherein the control module is configured to temporarily lock out the high side pass device responsive to the output of the first comparator until a reset signal is received.

5. The apparatus of claim 1, wherein the third current limit is lower than the first current limit and the second current limit.

6. The apparatus of claim 1, wherein the control module is configured to temporarily lock out the high side pass device and turn on the low side pass device responsive to the output of the second comparator until at least one of:
the third comparator detecting the current that falls below the third current limit, or
receiving a reset signal.

7. The apparatus of claim 1, wherein the high side pass device is turned on based on a current through the low side pass device and the low side pass device is turned on based on a current through the high side pass device.

8. A method performed by a voltage regulator having a high side pass device electrically coupled in series to a high side pass device, the method comprising:
detecting a current that meets or exceeds a first current limit;
detecting a current that meets or exceeds a second current limit;
temporarily locking out the high side pass device and turning on the low side pass device responsive to at least one of detecting the current that exceeds the first current limit or detecting the current that exceeds the second current limit; and
detecting a current that falls below a third current limit.

9. The method of claim 8, wherein the third current limit is lower than the first current limit and the second current limit.

10. The method of claim 8, further comprising:
detecting a reset signal.

11. The method of claim 10, further comprising:
responsive to at least one of detecting the current that fall below the third current limit or detecting the reset signal, turning on the high side pass device and locking out the low side pass device.

12. The method of claim 11, further comprising:
frequency folding to reduce an operating frequency of the voltage regulator.

13. The method of claim 11, wherein turning on the high side pass device and locking out the low side pass device comprise:
temporarily turning on the high side pass device and locking out the low side pass device.

14. The method of claim 11, wherein turning on the high side pass device and locking out the low side pass device comprise:
responsive to detecting the reset signal, immediately turning on the high side pass device and locking out the low side pass device.

15. The method of claim 8, wherein the second current limit is higher than the first current limit.

16. The method of claim 8, wherein temporarily locking out the high side pass device and turning on the low side pass device comprise:
responsive to detecting the current that exceeds the first current limit, temporarily locking out the high side pass device and turning on the low side pass device until a reset signal is received.

17. The method of claim 8, further comprising: operating the high side pass device and the low side pass device interdependently.

* * * * *